United States Patent [19]
Roesel, Jr.

[11] 3,931,535
[45] Jan. 6, 1976

[54] CONSTANT FREQUENCY MOTOR GENERATOR SET WITH ONLY ONE ROTOR

[76] Inventor: John F. Roesel, Jr., Rte. 2, Box 281M, Bradenton, Fla. 33505

[22] Filed: Sept. 24, 1973

[21] Appl. No.: 400,032

[52] U.S. Cl. .......... 310/113; 310/156; 321/64; 322/28; 322/29; 322/47
[51] Int. Cl.² .......... H02K 16/00; H02K 47/04; H02K 21/00
[58] Field of Search ...... 310/113, 156, 162; 322/47, 322/28-32; 321/64

[56] References Cited
UNITED STATES PATENTS

| | | | |
|---|---|---|---|
| 2,064,583 | 12/1936 | Wolkoff | 310/113 X |
| 2,610,992 | 9/1952 | Johns et al. | 310/113 |
| 3,521,149 | 7/1970 | Roesel, Jr. | 322/47 |

*Primary Examiner*—J. D. Miller
*Assistant Examiner*—Robert J. Hickey
*Attorney, Agent, or Firm*—George B. Oujevolk

[57] ABSTRACT

A single rotor, motor-generator set with motor and generator stators and one rotor turning adjacent the two stators. Preferably, the rotor is between the two stators. The rotor has a first rotor periphery facing the motor stator periphery and a second rotor periphery facing the generator stator periphery. There are driver means on the motor periphery and driven means on the rotor first periphery. Also there is a layer of permanent magnet material at least on the rotor second periphery. Furthermore, there is at least one magnetizing station along the generator stator periphery with magnet forming means thereat disposed to form permanent magnets in the rotor permanent magnet material as the rotor second periphery turns past said station with frequency excitation means coupled to said magnet forming means and, there is at least one set of power takeoff elements disposed at least partially around the periphery of the generator stator.

29 Claims, 17 Drawing Figures

CONSTANT FREQUENCY MOTOR GENERATOR SET WITH ONLY ONE ROTOR

BACKGROUND OF THE INVENTION

The present invention relates to a motor-generator set and more particularly to a three-phase constant frequency motor-generator having only one single rotor for both the motor and the generator, the output frequency of the generator being constant notwithstanding the fact that the rotational speed of the rotor may vary.

BRIEF REVIEW OF THE PRIOR ART

In the John F. Roesel, Jr., U.S. Pat. No. 3,521,149 there is shown how an A.C. generator can provide an A.C. output at a constant frequency with an input shaft rotating at varying speeds.

Although the description and drawings of the aforesaid U.S. Patent describe for the purpose of simplicity, a simple, single phase generator, the fundamental principals described therein apply to a motor generator which can be either a single phase or a polyphase machine. However, the expression "motor-generator" brings to mind two machines, namely: a motor and a generator. Also it brings to mind two similar machines in tandem with two separate rotational shafts. Indeed, taking the single phase machine described in the aforementioned John F. Roesel, Jr., U.S. Patent, and making use of these teachings for a three phase frequency converter motor generator, it is possible to build a three phase motor-generator which in outward appearances resembles present day machines in much the same way that a horseless carriage of 1900 resembled the horse drawn carriage. Thus, you can have a motor driven by a 50 Hz line driving a generator (wired for three phase) very similar to that shown in U.S. Pat. No. 3,521,149 to provide a 400 Hz output, the motor being in tandem with the generator. The present invention contemplates a complete departure from this antiquated concept since instead of two machines in tandem, the present invention contemplates one single integral unit serving as both a motor and a generator. The motor and generator portions of the machine may be coaxial or in tandem.

SUMMARY OF THE INVENTION

Generally speaking, the present invention contemplates a single rotor motor-generator wherein there is a cylindrical motor stator coaxial or in tandem with a cylindrical generator stator and a rotor turning which may be coaxial and preferably located between the motor and the generator stators. The rotor has driven means such as squirrel cage windings along the periphery facing the motor stator while the rotor periphery facing the generator stator is made of high retentivity permanent magnet material. The motor stator has driving means such as windings which will couple with the driven means, e.g., squirrel cage windings on one periphery of the rotor whereas the generator stator has a magnetizing head with frequency excitation means which will print magnets on the other periphery of the rotor at a predetermined frequency, and coils wound around the generator stator into which will be induced the electric current created by the magnetic field formed by these printed magnets. Even if there are changes in speed of the rotor caused by variations of the motor stator drive frequency, or generator loading, the frequency of the generator will remain constant for the reasons herein provided. If the generator is a three-phase generator, then the generator stator has first, second and third phase power output takeoff coils sequentially spaced thereon. There is at least one magnetizing head in the generator stator with frequency excitation means to supply a desired frequency to the magnetizing head so that as the rotor rotates, permanent magnets with poles are endlessly imprinted in the permanent magnet material as the rotor periphery facing the generator passes before the magnetizing head. As in a three phase machine, these permanent magnets then sequentially induce power in the first, second and third phase power output takeoff coils, and these permanent magnets are then partially erased from the permanent magnet material as these magnets again pass before a magnetizing head at which time new permanent magnets are imprinted in the permanent magnet material. In a three phase machine, voltage regulation is accomplished by sensing means, sensing the voltage in the power output takeoff coils, a feedback loop between the power output takeoff coils, and, the electric excitation means which controls the magnetic strength of the imprinted permanent magnets.

The invention, as well as other objects and advantages thereof, will be more apparent from the following detailed description when taken together with the accompanying drawings in which:

BRIEF DESCRIPTION OF THE DRAWINGS

FIG. 7 is a cross-sectional view of the motor generator in a plane normal to that shown in FIG. 3a;

DETAILED DESCRIPTION

Theory—Single Phase

Figure 1:
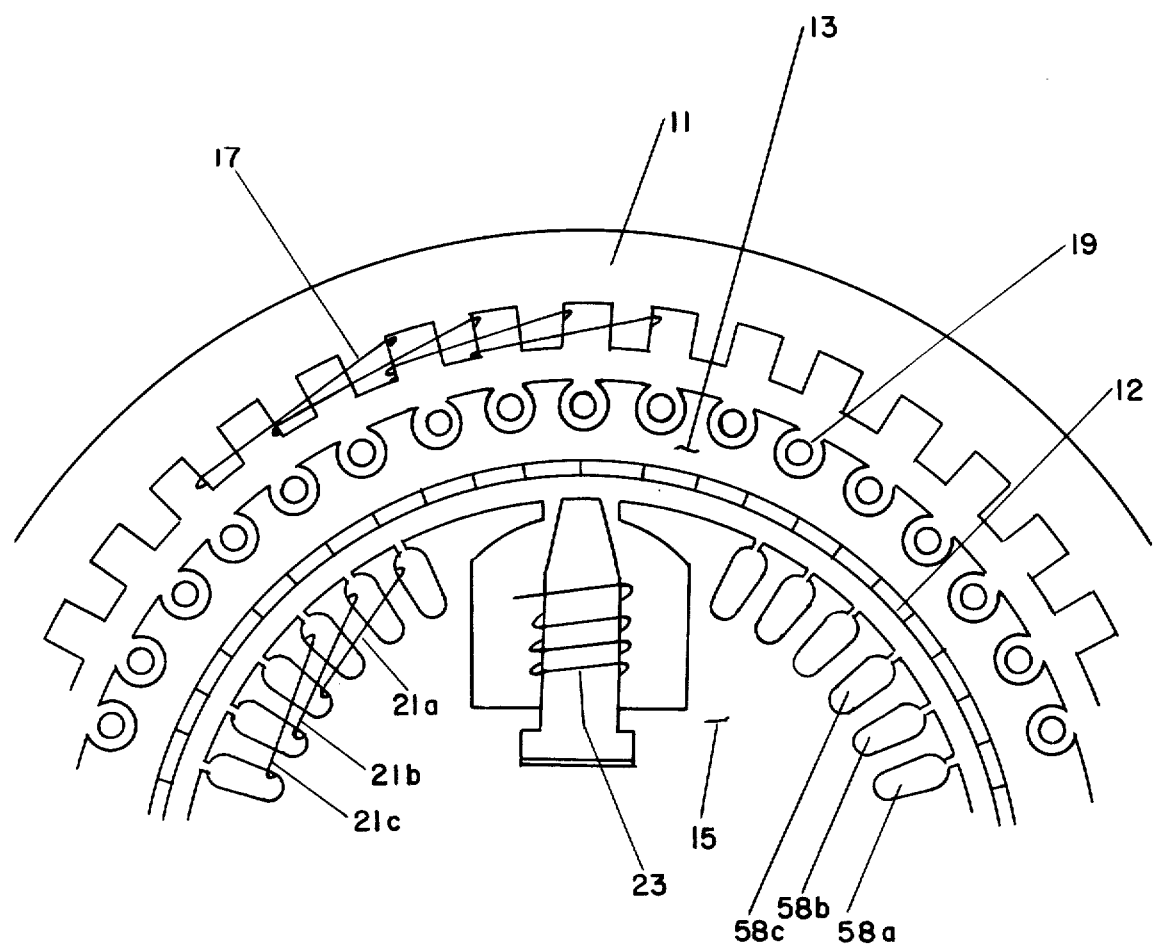
FIG. 1 is a schematic explanation of the inventive concept.

Before going into the mechanical components required to construct the apparatus of the invention, it is first necessary to understand the fundamental principles involved with regard to the generator portion of the motor-generator set herein contemplated.

As is well known, the fundamental equation for a-c machines is given by the equation:

$$f = rps \times P/2$$

where $f$ is the frequency in cycles per second, rps is the revolutions per second, and, $P/2$ is the number of poles divided by two which for the purpose of the present invention will be referred to as pole pairs.

Let us imagine a wheel turning past a sensing station. To one side of the wheel is a loading station. Located next to the loading station are a series of pole pairs of progressively increasing sizes. The loading station will load pole pairs around the periphery of the wheel so that the pole pairs are sequentially adjacent to one another. If we assume that the speed of wheel is 4 rps and a frequency of sixty cycles per second is to be sensed at the sensing station, it is quite obvious that in accordance with the equation shown, the loading station must load poles of such a size that 15 pole pairs are on the wheel periphery. If the rotational speed is 2 rps then 30 pole pairs must be loaded on the wheel periphery and at 1 rps, 60 pole pairs must be loaded on the periphery. These pole pairs which are loaded on the wheel periphery are caused to travel past the sensing station. They are then unloaded at the unloading station. Therefore, the required number of pole pairs are not necessarily loaded all around the periphery, just so long as the correct size of pole pairs are first loaded, then pass the sensing station and are then unloaded. As the wheel rotational speed increases, less pole pairs are required, since the periphery of the wheel must be filled with pole pairs, these pole pairs must be of increasing length. If the rotational speed increases, the loading station must change the size of the pole pairs accordingly, i.e., the angle that the arc of the pole pairs subtend must be greater so that the amount of pole pairs loaded on the periphery multiplied by the rotational speed of the wheel, equals 60 or the desired frequency.

Briefly stated therefore, if there is a rotor disposed adjacent to a magnetizing head (similar to a "write" head of a tape recorder) which will print magnets on the periphery of the rotor, these magnets will then cause a flow of current in a sensing station or power take-off winding as the rotor revolves. Then, as the imprinted magnet comes back around it is erased by the same magnetizing head that printed the magnet in the first instance. This erasing is done at the same time that the magnetizing head prints another magnet at the spot where the first magnet was located (i.e., is being erased). Continuing with the assumption that the magnetizing head is operating (i.e., printing magnets) at 60 times a second, then if the rotor makes one revolution per second, sixty small magnets will have been printed thereon. When the speed increases to 2 rps, 30 magnets will be printed thereon, and, considering increasing the rotational speed of the rotor while going back to the fundamental equation hereinbefore given, it will be seen that as the rotor speed (rps) increases, the number of pole pairs (P/2) decreases in exact proportion thereto.

When considering the description of the invention given herein, it must be remembered that the expression "permanent magnet" as used herein is used as this term is customarily understood in the art. Thus, a material becomes a permanent magnet if it will retain its magnetic characteristics indefinitely once it has been magnetized, unless acted upon by some outside influence. In the present invention, permanent magnets are erased from the rotor. Nevertheless, for the short time that these magnets are on the rotor they are permanent since if they had not been erased they would have remained there indefinitely.

Therefore, as described in U.S. Pat. No. 3,521,149 a single phase electric A.C. generator for producing an output of constant A.C. frequency from a rotational input of varying speed may be constructed using a rotor member, with a drive shaft and a core of high permeability magnetic material supported by the shaft, with a defined periphery on the rotor member. There is a layer of permanent magnet material on this periphery which, when imprinted upon by a magnetizing head will become permanently magnetized. Disposed adjacent the outer periphery is a magnetizing head to create a magnet field across the travel path of the permanent magnet material. The magnetizing head includes excitation means to create an A.C. excitation of a desired frequency in the magnetizing head so that permanent magnets with poles are endlessly imprinted in the permanent magnet material as the rotor periphery passes adjacent the magnetizing head, these permanent magnets are then erased therefrom as they again pass before the magnetizing head at which time new permanent magnets are imprinted in the magnet material to maintain proper rotor pole spacing in order to achieve constant poles per second past power output means for any speed of the rotor. The power output means are angularly disposed about the rotor periphery away from the magnetizing head and generally comprise a take-off coil with output leads so disposed that electric power is induced in the take-off coil as the imprinted permanent magnets pass opposite to the take-off coil.

Theory—One Rotor Coaxial Motor-Generator

Figure 2:
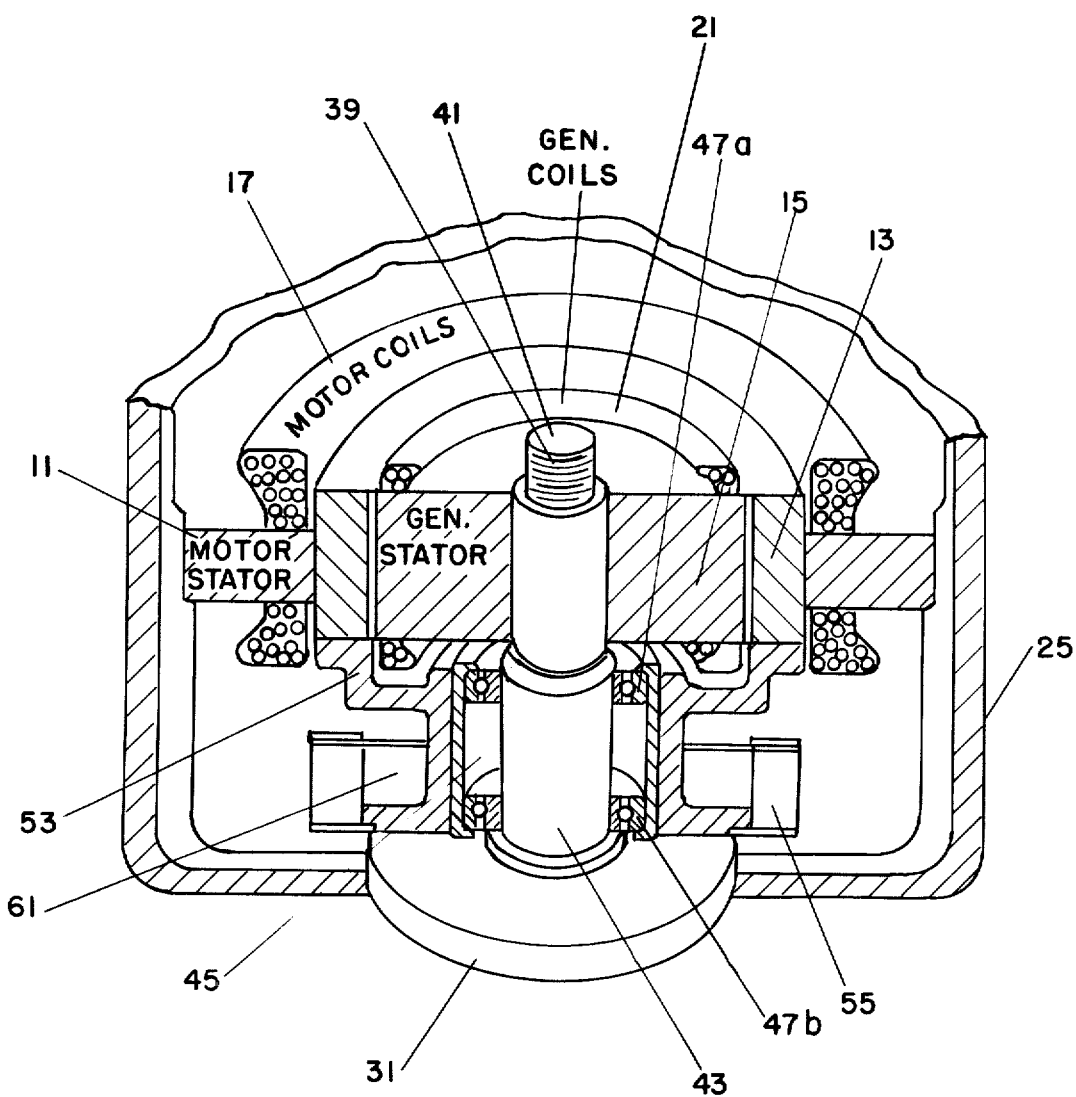
FIG. 2 shows a perspective view of the principal components of the three phase motor-generator contemplated herein.

FIG. 1 shows the principal components of the inventive concept in schematic form, namely, the motor stator 11 being the outer cylinder, the generator stator 15 being the inner cylinder. The rotor 13 rotates between the two stators. On the inner periphery of the motor stator are windings 17 and opposite motor stator 11 on the outer periphery of the rotor are rotor conductor bars 19 so that the combination of the motor stator 11 and the rotor 13 with their respective windings and bars 17 and 19 form a squirrel cage induction motor. The generator stator 15 and the rotor 13 taken together (and for the moment ignoring the motor stator 11) represent an inside-out type of wound machine. This type of machine is known in the art (see FIG. 2, S. Saslow et al., U.S. Pat. No. 3,196,940). Disposed around the generator stator 15 are coil windings 21a, 21b, 21c wound 120° apart to form a three phase output. Only a portion of these coils are shown in FIG. 1.

In one portion of the generator stator 15 there is a magnetizing head 23 which prints magnets on magnetic material 12 of the rotor 13. These magnets then pass before the three sets of coils and sequentially inducing power in windings 21a, 21b, 21c separated in phase by 120°.

In the motor-generator set depicted in FIG. 1, the motor stator, or more properly, the driver stator 11 and the rotor 13 with the respective windings 17 and bars 19 form a conventional squirrel cage motor whereas the same rotor 13 revolving around the generator stator 15 with takeoff coils 21a, 21b, 21c and with a magnetizing head 23 forms a constant frequency (three-phase) generator as described in the aforementioned John F. Roesel, Jr., U.S. Pat. No. 3,521,149.

Mechanical Construction—One Rotor Motor-Generator

A practical embodiment of FIG. 1 is depicted in FIGS. 2, 6, 7, 8, 9 showing an outer cylindrical housing 25. Housing 25 is divided into a solid state electronics upper housing (FIG. 7) 27 and an electro-mechanical lower housing 29. In the lower housing 29 there is a central dish-like stand 31 held to the housing 25 by bolts 33. Stand 31 supports a stationary threaded support shaft 41 which passes through the lower housing 29 and is journaled in a plate 37 which separates the upper and lower housings. The threads 39 at the upper part of the shaft are visible in FIG. 2 and FIG. 6. Mounted on the upper part of the shaft 41 is a stator boss which supports the generator stator 15. At the lower part of shaft 41 is the rotor boss 43 around which is the rotor bearing structure 45 with sealed ball bearings 47a and 47b. The rotor bearing structure supports the rotor hub 51 of a rotor cup 53. Radially outwards of the rotor cup 53 is the motor or driver stator 11, which is held to the lower housing 29. Around the outer periphery of the rotor cup 53 are the squirrel cage bars 19 which face corresponding coils 17 on the inner periphery of the driver stator 11. On the outer periphery of the generator stator 15 are the generator coils 21.

Cooling and Electronic Packaging

Disposed over the lower housing is an upper housing 27 (FIG. 7) which will house the solid state electronic voltage regulator and frequency control equipment hereinafter described. These components together with the motor generator components hereinbefore described are cooled by a blower 55 extending radially outwards from the rotor hub. The cooling air which is suctioned through the machine by blower 55 enters the machine through the upper housing 27, which has an air inlet filter 57 around the upper housing. Air entering the air inlet filter 57 circulates across the upper housing, through inlet passages 59, and down around both sides of the rotor to the blower 55. The air exits the blower 55 from an air outlet 63. The cooling air is circulated throughout the lower housing by the rotation of the rotor.

One-Rotor Motor Generator Electro-Mechanical Features

Figure 7:
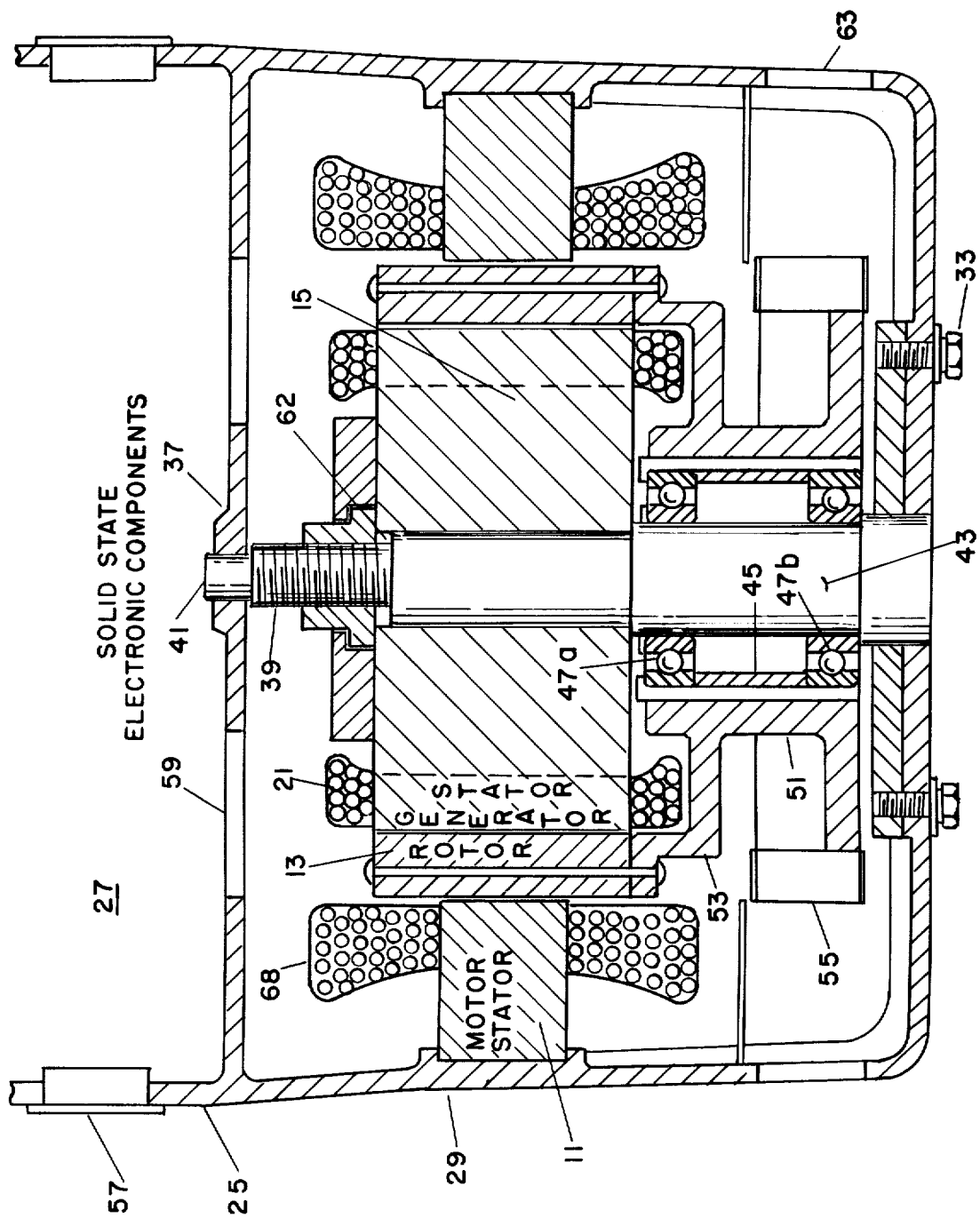

The electro-mechanical features of the machine are best understood from FIG. 7 showing the two stators with the rotor in between. As in all motor-generator sets, this one consists of two machines: a motor and a generator. The motor portion can be considered as a standard squirrel cage induction with a standard outer stack having inner peripheral slots filled with windings 68. This portion of the machine requires little explanation since squirrel cage motors are well known in the art. It is the generator portion of the machine with which we are primarily concerned.

The generator portion of the machine is of the inside-out type with the generator stator 15 inside the rotor 13, the rotor 13 being so disposed as to rotate around the outside of the stator. The generator stator has a cylindrical stack made of thin sheets of laminations. These sheets are stamped out as discs (FIG. 6) with peripheral radial slots 58 for the windings and a large peripheral slot 60 for the magnetizing head 23. There is also a central axial aperture 62 for the rotor support shaft and holes for bolts. A number of discs held together by a shim and bolts form the stack. The slots are so assembled in a stack as to form grooves in the cylinder. The number of grooves so formed will be chosen for best magnetic coupling at the desired speed range. The magnetizing head slots however are offset in the stack so that the magnetizing head is at an angle to the rotor axis. Disposed around the periphery of stack in appropriate slots (FIG. 9) 58a, 58b, 58c are coils 21a, 21b, 21c. Since the slots 58 are axial, (FIG. 8) the portion of the coil in the slot is also axial.

Passing through the center axial aperture 62 is the stationary support shaft 41 for the rotor. The rotor is cup shaped as previously explained having a central rotor bearing structure 45 and coupling rotor hub 51 to support shaft 41.

Inside-Out; Outside-In; In Tandem

Figure 3:
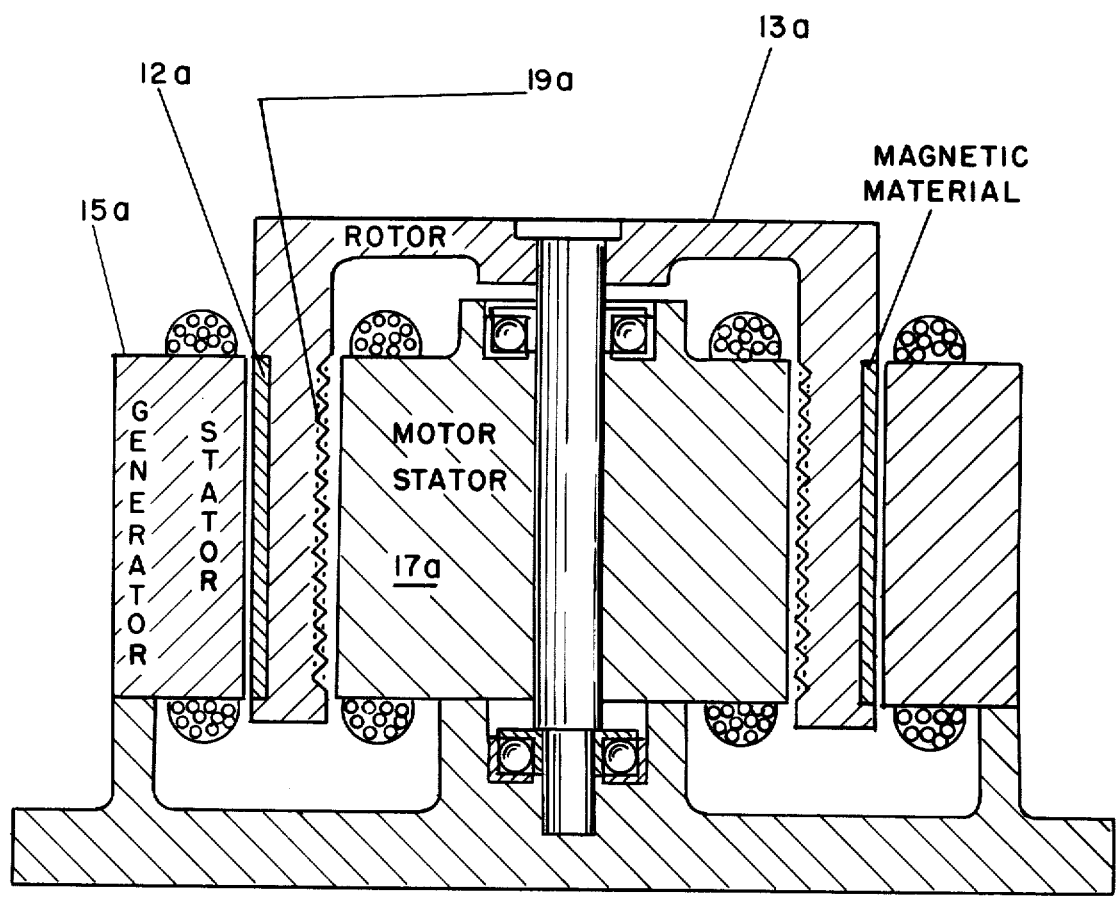
FIG. 3 presents a sectional view of a motor-generator set similar to FIG. 2, but with the positions of the motor and generator being reversed.

As illustrated in FIG. 3, the physical locations of the motor and generator stators can be reversed. In FIG. 3, the motor stator 17a is on the inside, the rotor 13a, turns outside of the motor stator 17a and has a squirrel cage 19a facing the motor stator, the generator stator 15a is radially outwards of both the motor stator 17a, and the rotor 13a, and the magnetic material 12a is on the outer periphery of the rotor facing the generator stator 15a. It is also possible to have the motor and generator stators in tandem with the rotor revolving either radially inwards (FIG. 5) or radially outwards (FIG. 4) of the stators. The stators can actually be one stator with two elements or two separate units, as shown in FIGS. 4 and 5.

Figure 4:
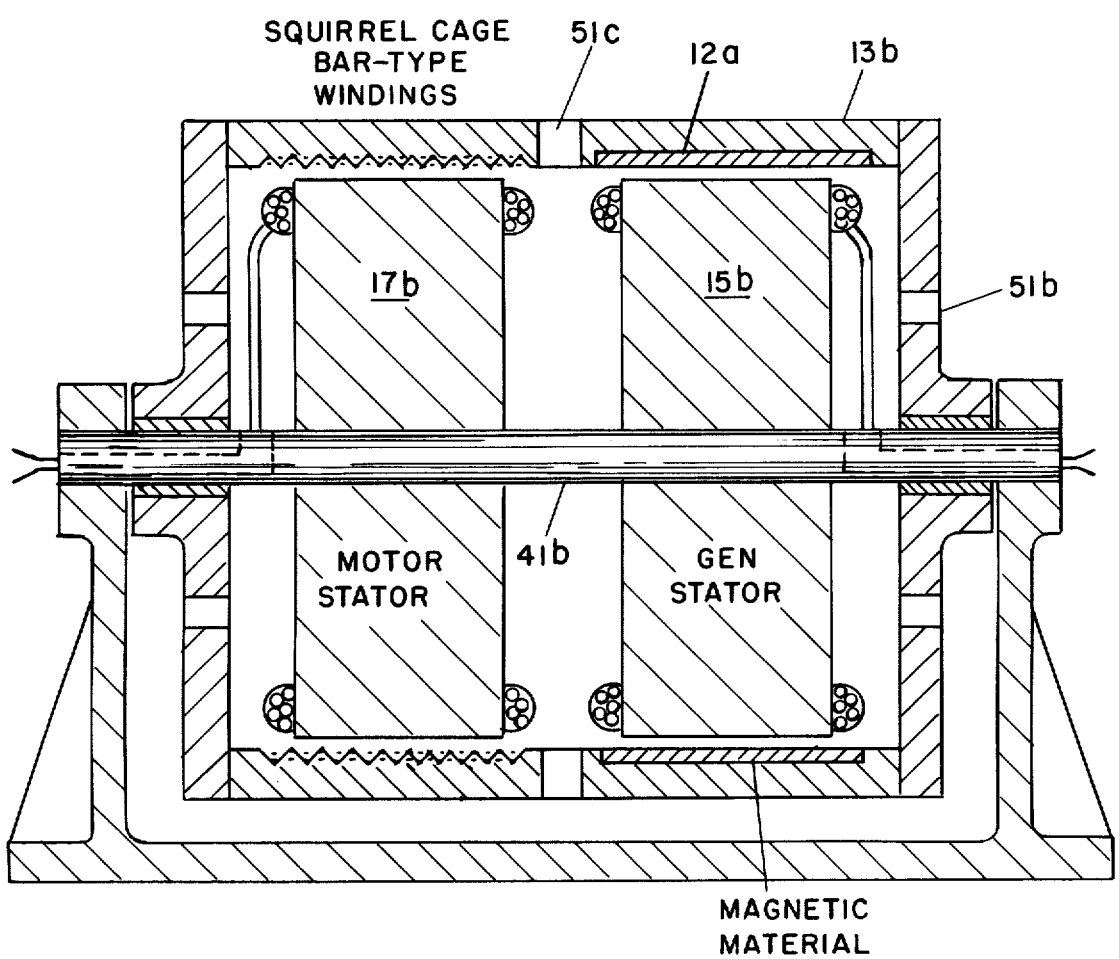
FIG. 4 shows a sectional view of a motor stator and generator stator in tandem with one rotor outside of both of them.
Figure 5:
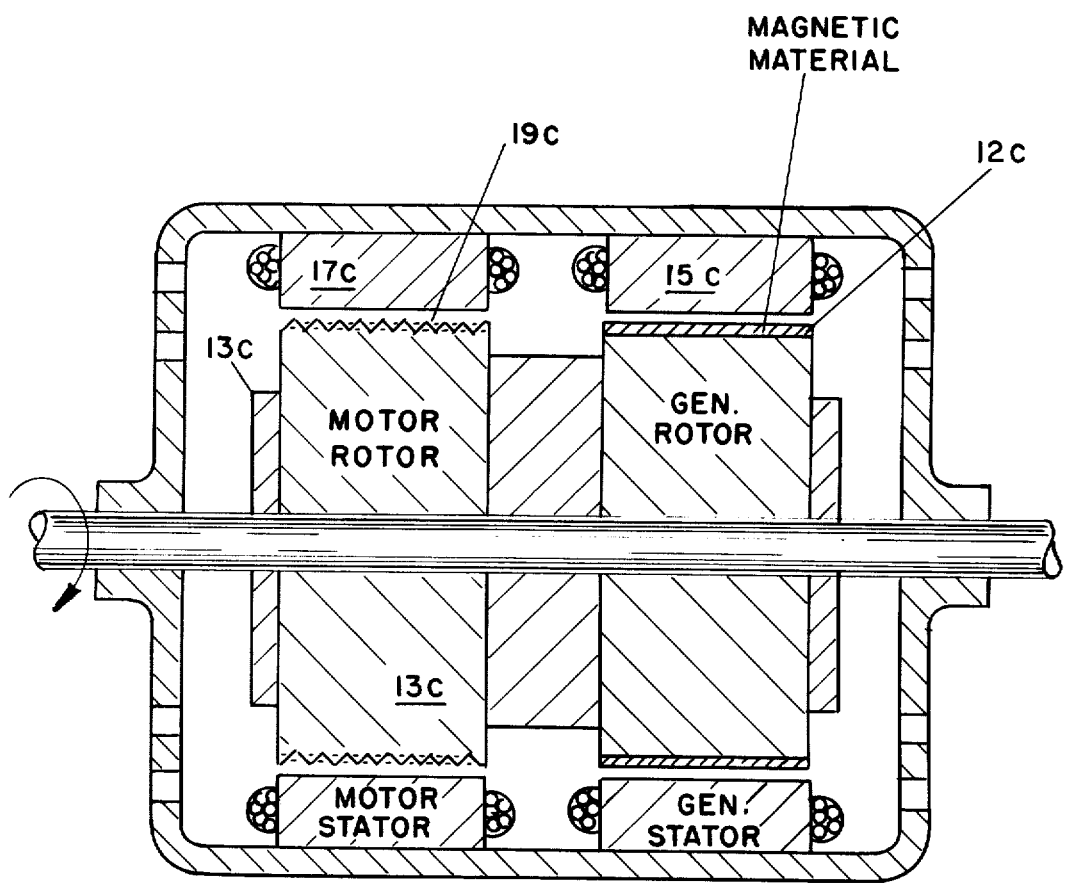
FIG. 5 again illustrates the opposite of FIG. 4, namely a rotor on the inside with a motor and a generator stator on the outside.
Figure 6:
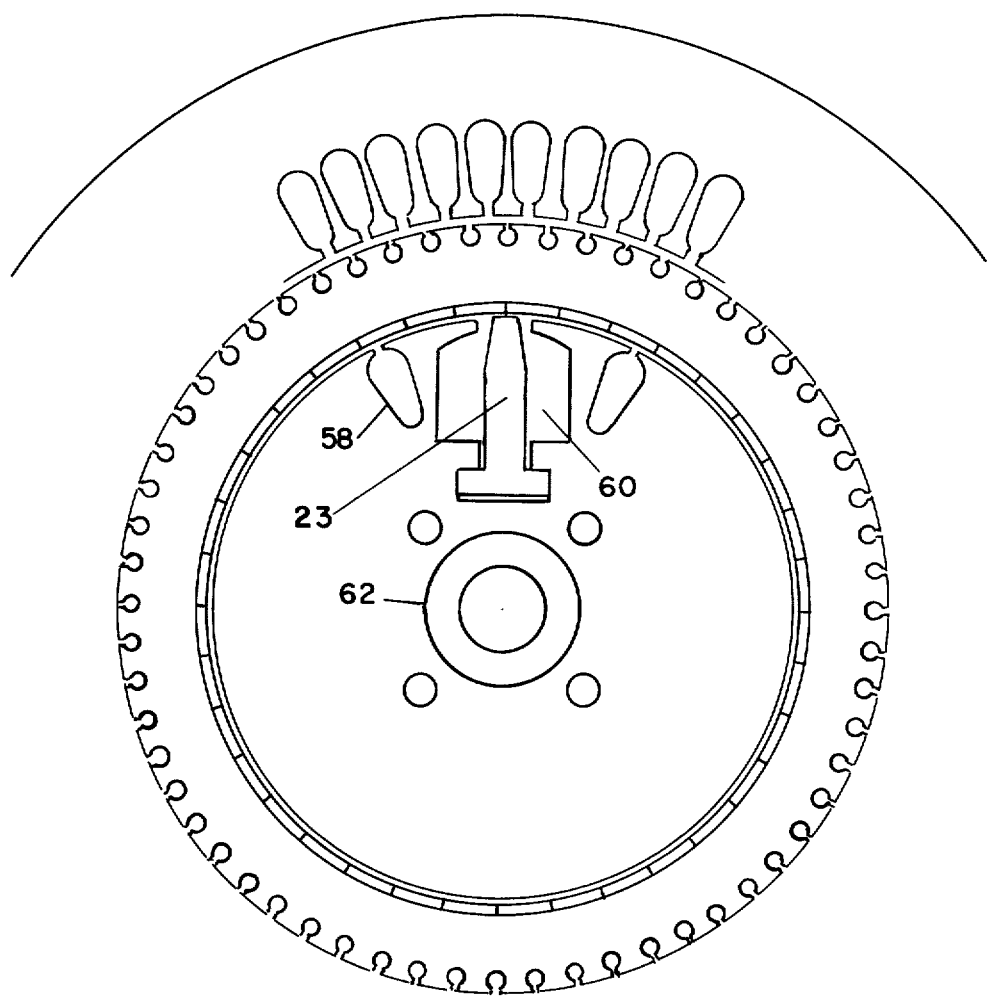
FIG. 6 depicts in cross-section the motor and generator stator laminations as well as the rotor used in the motor-generator set of FIG. 2.

As shown in FIG. 4, the tandem stack single rotor is a compact motor-generator converter concept. The motor stator 17b and the generator stator 15b are mounted in tandem on a fixed shaft 41b. The single rotor 13b revolves around the motor stator 17b and the generator stator 15b. For cooling, air holes or vanes 51c are placed along the periphery of the rotor. The air holes or vanes act as a centrifugal air pump drawing air in through the air holes 51b near the center of each end and through each stator. Electrical conductors from each stator are fed through holes in the fixed shaft. The single rotor concept applies also when the motor stator and generator stator are outside and the rotor turns inside (FIG. 5). This is an alternate tandem configuration motor generator converter concept when the motor winding 17c and the generator winding 15c are fixed on the stationary outer case of the converter. The motor squirrel cage 19c adjacent to the motor stator 17c and the magnetic material layer 12c adjacent to the generator stator 15c are mounted on and outwards of a common laminated steel rotor structure 13c turning on a rotating shaft. Air passages through the rotor 13c and around the stators provide paths through which the internal fans can draw and circulate air.

Having hereinbefore shown that it is possible to have the motor and generator stators either in tandem, as one unit, or coaxial, either one being on the inside or outside, it is readily apparent that by using a cup-shaped rotor, the rotor can be disposed to turn outside or inside of both motor and generator stators which are disposed coaxially. True, the motor machine herein shown has been an electric motor, but it is possible to use a non-electric, e.g. gasoline, engine for the motor where the driver means and driven means are pistons, cam shafts and gearing. With a gear drive machine such as an aircraft engine and using a cup-shaped rotor on the radial inside of both the motor and generator stators, a high torque and high speed output is obtained capable of rapidly driving a large heavy rotor around the inner periphery of the generator stator so as to obtain a very high voltage. All the electronic package hereinafter described, together with heavy duty power output leads, are radially outwards of the fast-spinning rotor which can be properly cooled by fan blades on the rotor and air cooling passages in the machine.

Figure 8:
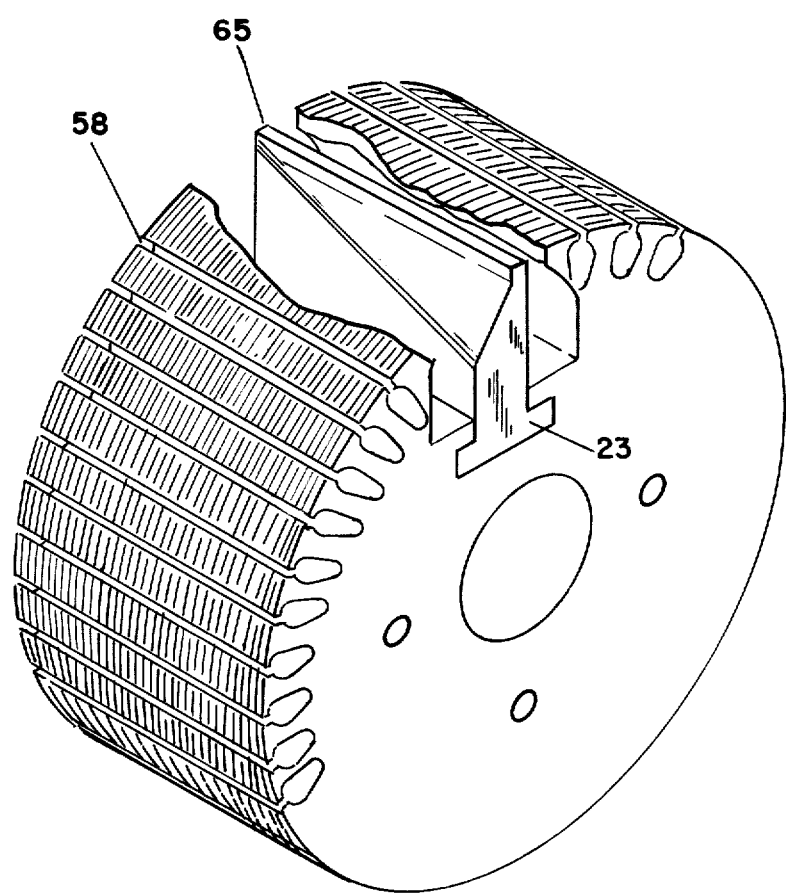
FIG. 8 shows a top perspective view of one magnetizing head of the generator contemplated herein.
Figure 9:
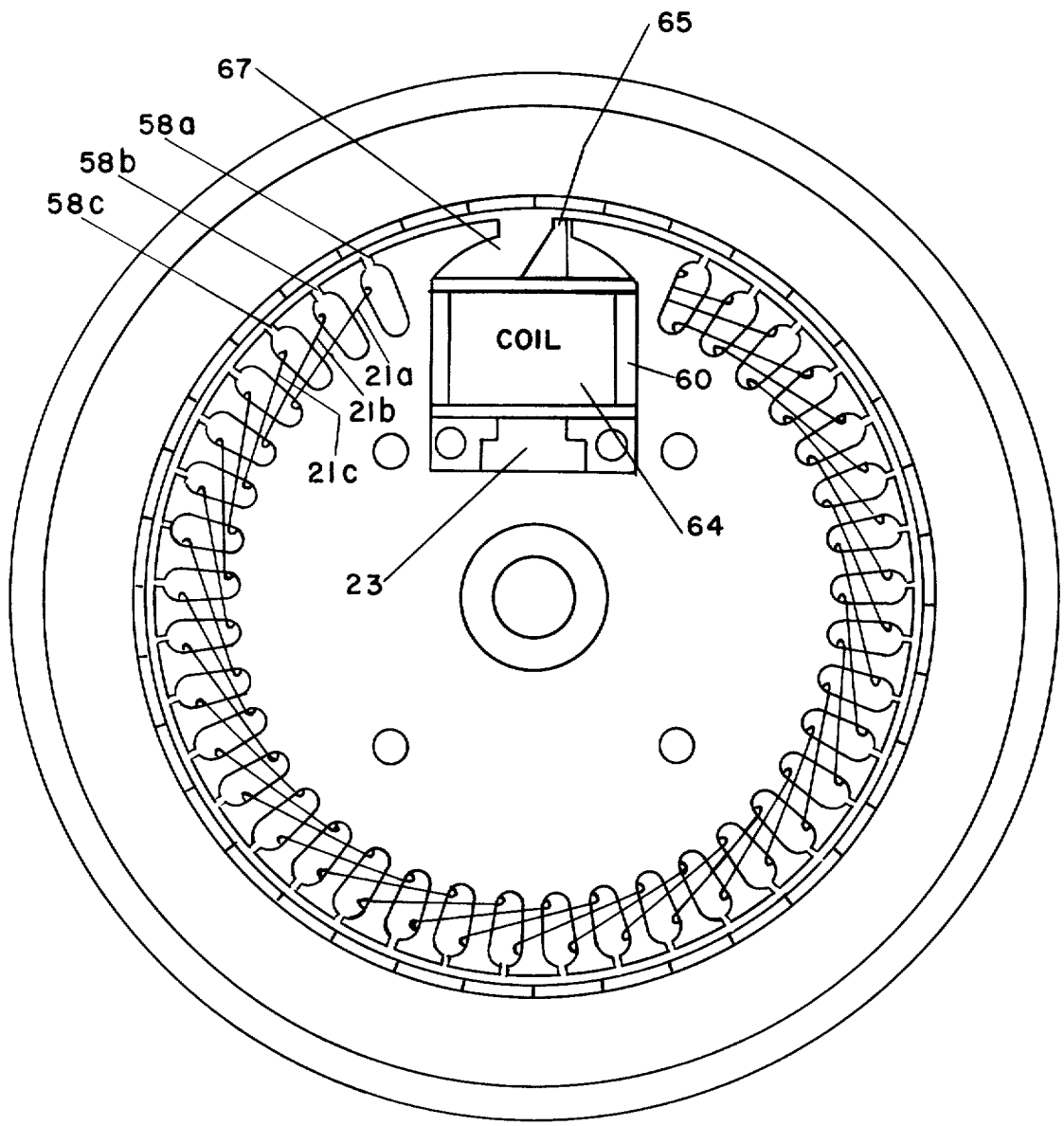
FIG. 9 is a sectional view of the magnetizing head of the generator contemplated herein, shown in FIG. 4.

Undesired harmonics can be eliminated by the construction of the magnetizing head as shown in FIG. 8. In assembling the stack, the slot opening for the magnetizing head is machined into the large slot 60 and the magnetizing head has a winding 64 around the main body 23 of the head with a pole face 65 disposed at an angle to the axis of rotation (see FIG. 8). This angle will enhance the performance for particular rotational speeds. Although, in theory, the machine should operate at any range of rotational speeds, in practice the speed will vary only within a certain range and the angle of the pole face to the axis will depend on the speed range of the machine. The construction of the pole face at an angle will help form a better sine wave shape for the output voltage pattern.

Electronic Package

The necessary electronics to operate the generator are located in the electronics package in the upper housing 27. For ease of explanation, these circuits are herein described as if they were outside the housing. As is well known in the art, these circuits are solid state circuits and are carded and packaged so as to fit in the uppper housing 27.

Figure 10:
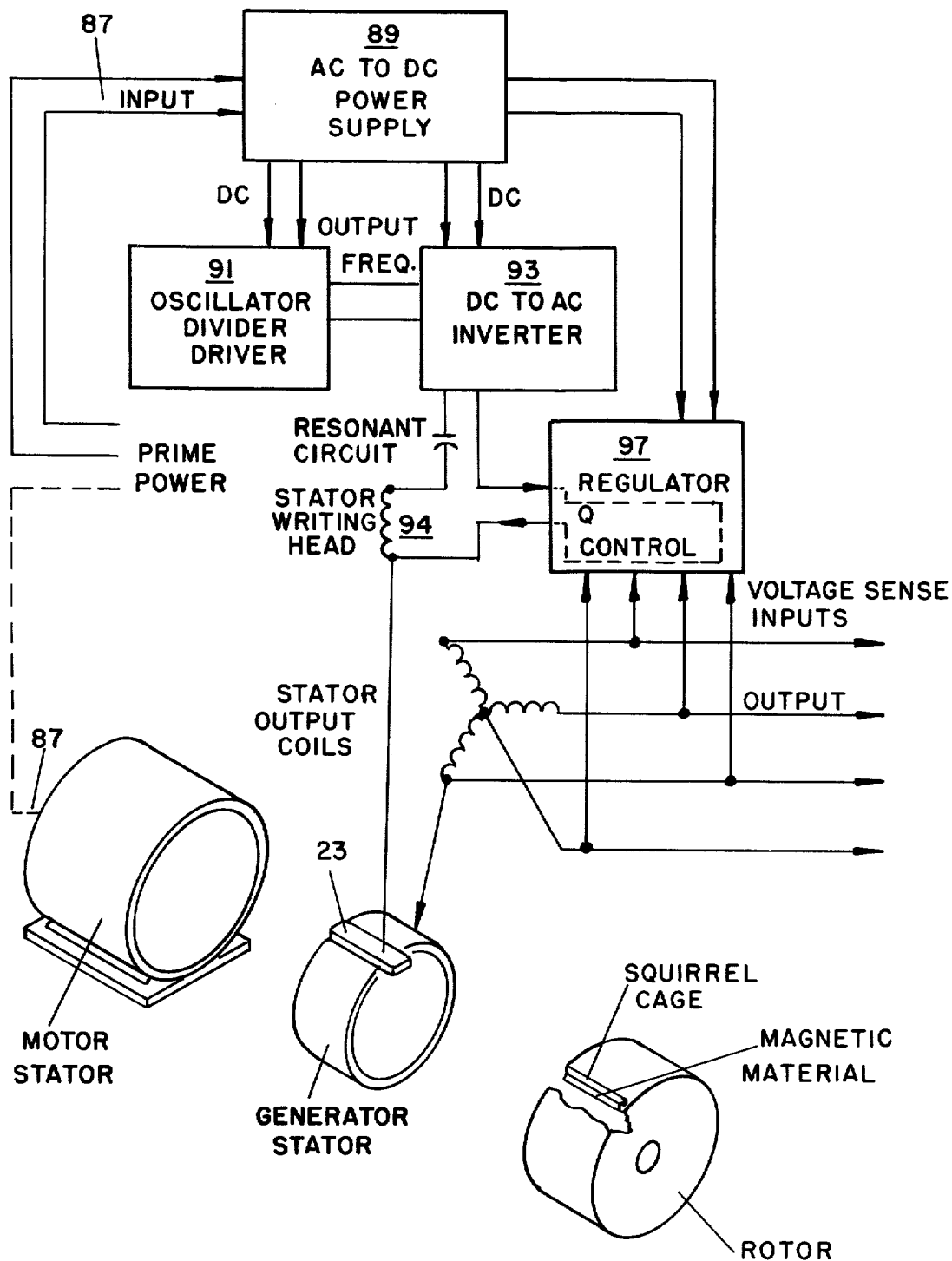
FIG. 10 is a diagram of the excitation and feedback loop circuitry.

The electronic circuitry is explained in FIG. 10. In theory, the excitation frequency for the magnetizing head could be supplied by a battery coupled to a D.C. to A.C. inverter with a crystal frequency. In practice, however, although a battery is sometimes used as an auxiliary power source, if the main power fails, the principal power source is line power 87 which is running the motor portion of the motor-generator. This line power is rectified in an A.C. to D.C. rectifier system 89 which is fed to a frequency standard and countdown frequency divider unit 91 and also to D.C. to A.C. inverter 93. The frequency standard and countdown dividers receive a low D.C. voltage of about five volts while the D.C. to A.C. inverter receives about 12 volts and about 40 v. The D.C. to A.C. inverter therefore delivers the desired excitation frequency to the excitation head 23 in excitation slot 60 across a resonant circuit 94. Also, a regulator 97 in series with the exciter head drive circuit is controlled by a signal sensor from the output of the generator.

To summarize, therefore, to supply excitation at a fixed frequency to the excitation head, from a line voltage 87, there is an A.C. to D.C. inverter 89 feeding low voltage on one side to a frequency standard and countdown dividers 91 and feeding power to a D.C. to A.C. inverter 93. The frequency standard and countdown dividers 91 are coupled to the D.C. to A.C. inverter 93. The D.C. to A.C. inverter supplies the excitation frequency to the excitation head 23 across a resonant circuit 94. The excitation head in turn is controlled by a regulator 97.

Power Supply

Figure 10A:
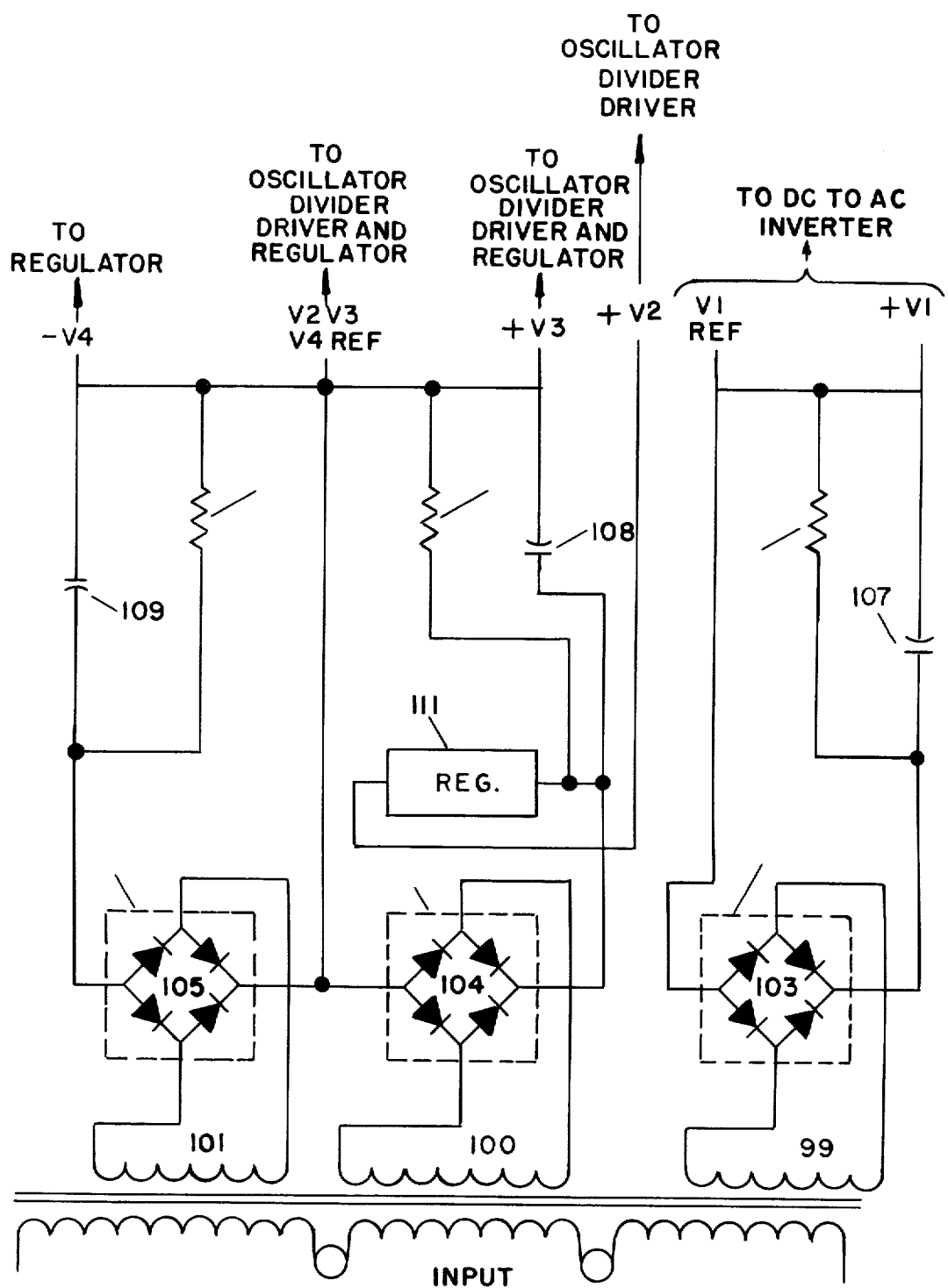
FIG. 10a presents a view of the power supply portion of the circuitry shown in FIG. 10.

The A.C. to D.C. rectifier system 89 connected to the power line 87 is shown in FIG. 10a. It has three transformer secondaries 99, 100, 101, each connected to a diode bridge 103, 104, 105, forming high and low voltage stages. The stages have filter capacitors 107, 108, 109, one low voltage stage includes a voltage regulator 111.

Frequency Source

Figure 10B:
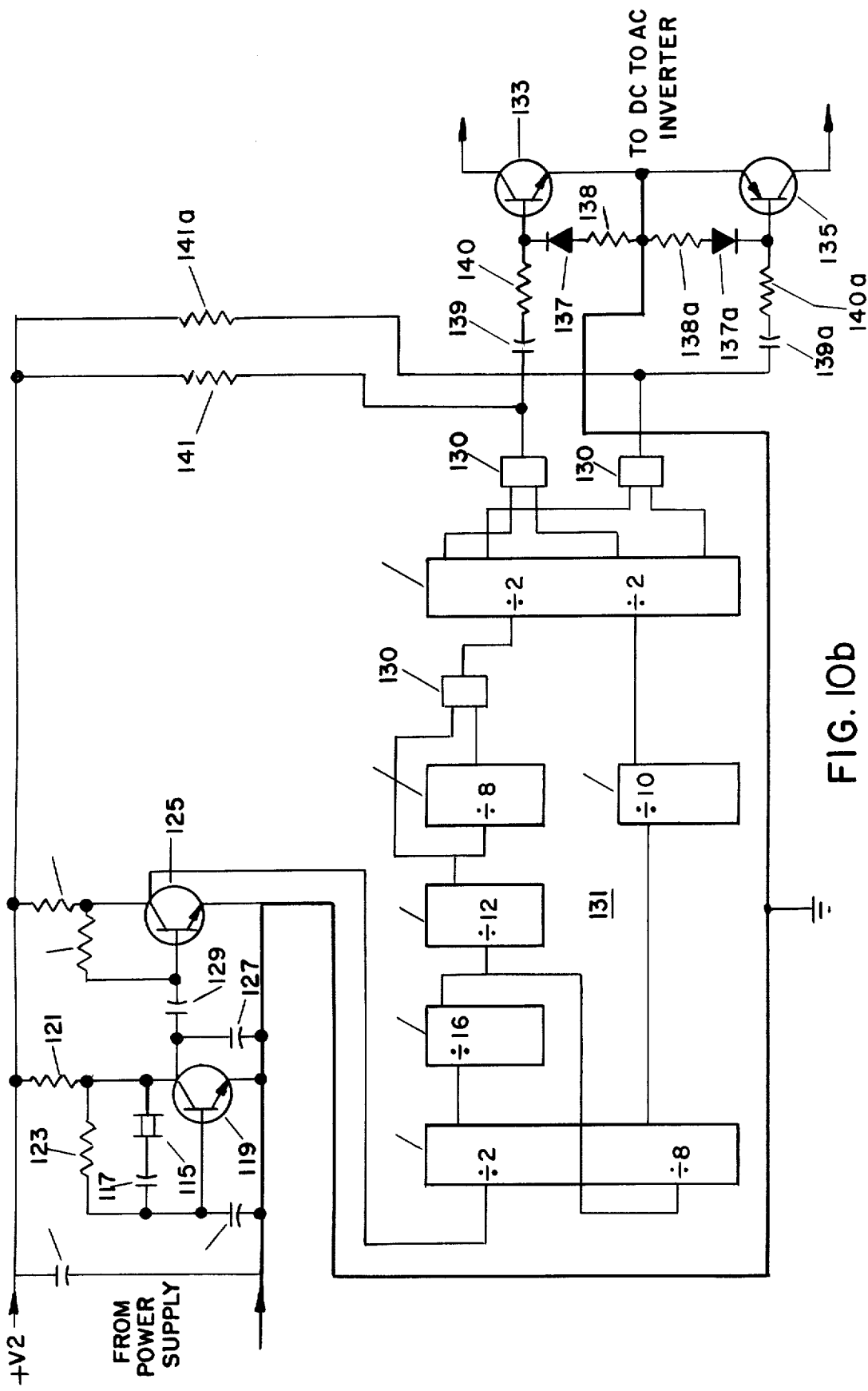
FIG. 10b is a circuit diagram of the frequency determination portion shown as a block of FIG. 10.

As hereinbefore explained, it is necessary to provide an excitation frequency corresponding to the desired frequency out-put of the generator. This excitation frequency is provided by the frequency standard and countdown dividers shown in FIG. 10b. This stage is supplied by the low voltage five volts. Frequency is fixed by a crystal 115 in series with a capacitor 117 providing feedback to NPN transistor 119. Transistor 119 also has bias components 121 and 123 and is connected to the base of a second NPN transistor 125 using coupling capacitors 127 and 129. Transistor 125 operates a set of frequency dividers 131. These are solid state integrated circuit units purchased commercially, e.g., from Motorola or other makers, and will divide the crystal frequency by ½; ¼; ⅛; 1/16, etc. The result therefore is that the desired frequency is fed to the D.C. to A.C. inverter. In the divider chain, the selectability of desired frequencies, i.e., 50H, 60H, 400H, is easily accomplished by connector switches 130 routing the desired frequencies to drive transistors 133 and 135.

D.C. to A.C. Inverter

Figure 10C:
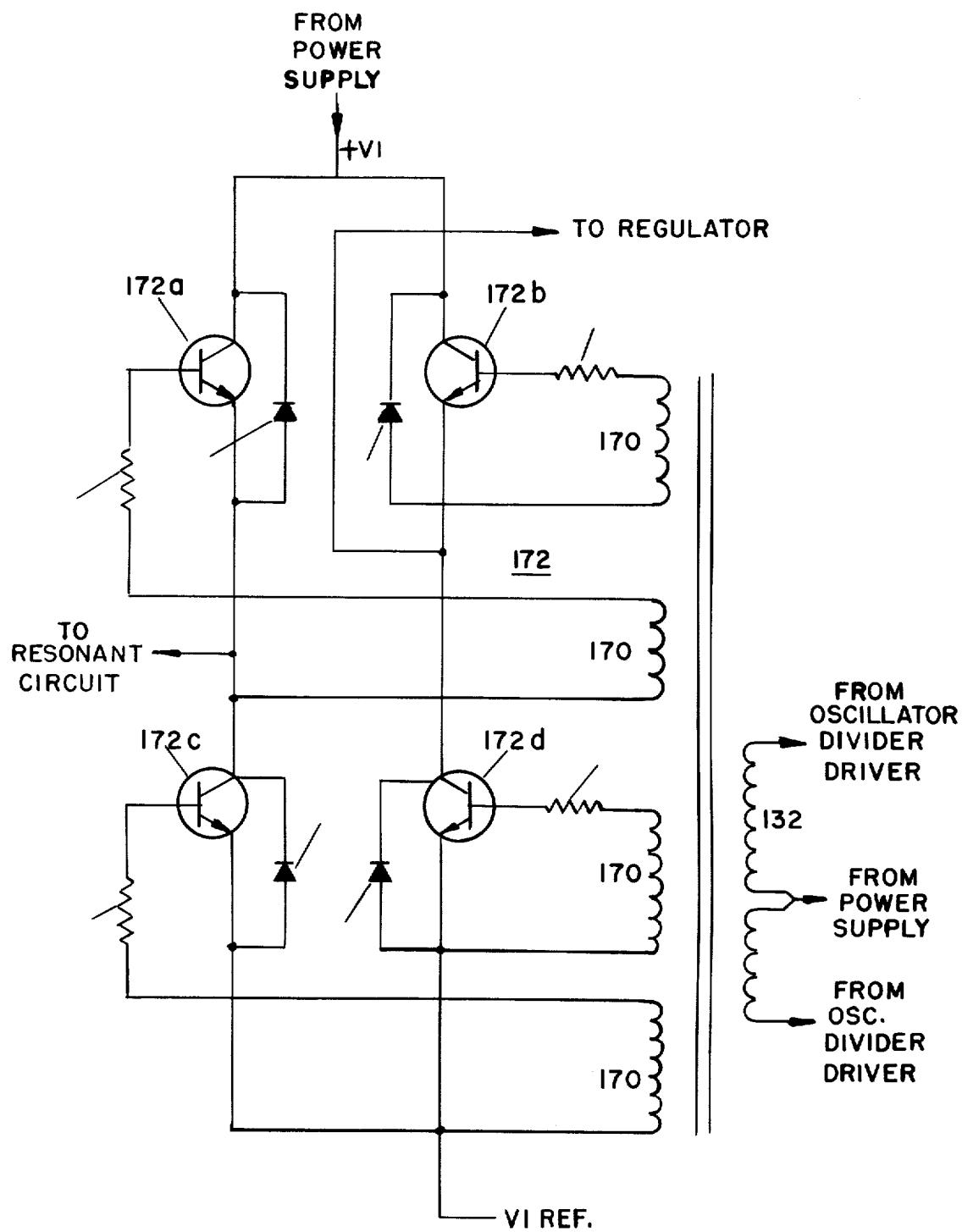
FIG. 10c shows the D.C. to A.C. inverter of the corresponding block in FIG. 10.

Four individual drive secondaries (FIG. 10c) 170 are supplied by the one primary 132. The driver stage (FIG. 10b) consists of the two power transistors 133 and 135 driven by the countdown dividers 131. Power from the transistors is supplied to the primary 132 (FIG. 10c) which is connected by a center tap to the 12 volt side of the A.C. to D.C. rectifier system. The two power transistors 133 and 135 (FIG. 10b) have their collectors connected to each primary and their bases biased by a diode 137 and resistors 138, 140 and 141, and a coupling capacitor 139. Transistors 133, 135 are fed by the countdown dividers. They, in turn, control a four transistor bridge 172 (FIG. 10c) coupled to excitation head 23 in series with a resonant tuning capacitor circuit 94, i.e., the resonant circuit 94 is fed by a transistor bridge 172 having four transistors, 172a, 172b, 172c, 172d. The transistor bridge is fed by four individual drive secondaries 170. These transistors are so biased that transistors 172a, 172d, pass current on one half cycle, while transistors 172b, 172c, pass current on the next half cycle.

Power Regulator

Figure 10D:
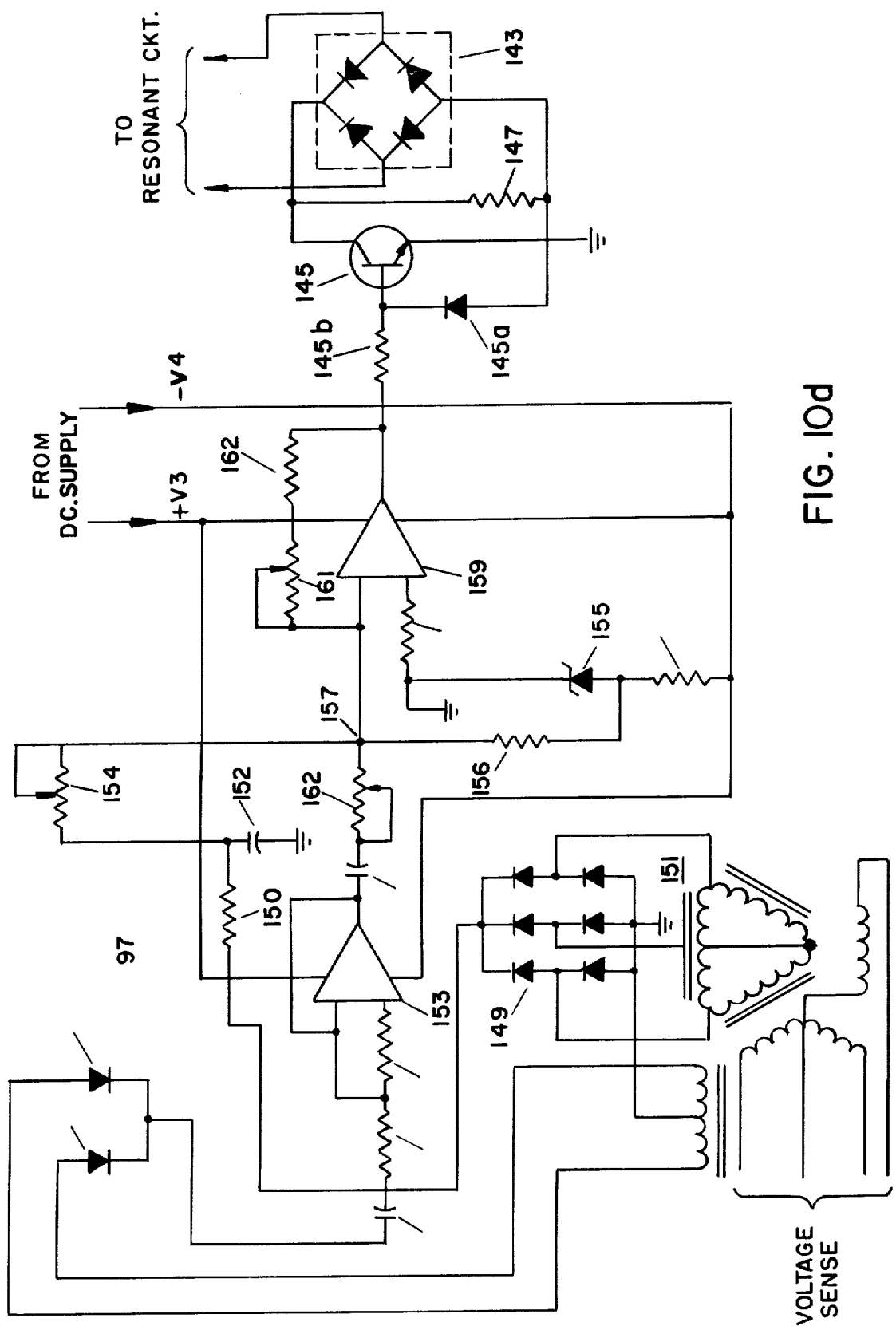
FIG. 10d provides the regulation circuitry of the corresponding block of FIG. 10.

The power regulator functions effectively as a variable resistance in the resonant exciter head excitation drive circuit. Transistor 145 (FIG. 10*d*) is a power transistor operated in the linear region whose conductance is controlled by the base current level. Resistor 147 is a power resistor across transistor 145 to limit the maximum resistance which can appear across the regulator A.C. terminals when the transistor 145 is cut off. Power rectifier bridge 143 is provided to allow the bi-directional A.C. current in the excitation circuits to be controlled by a unidirectional transistor 145. Diode 145*a* between the emitter and base prevents excessive reverse base voltage from damaging the base emitter junction of transistor 145 and base resistor 145*b* in a current limiting resistors to couple the output of a gain amplifier 159 to the base of transistor 145.

The +12v and −12v supplied from the A.C. to D.C. rectifier system are coupled to a gain amplifier arrangement 159. Reference diode 155 and a resistor arrangment form a negative reference voltage level. The output A.C. voltage level is sensed by a 3-phase sensing transformer 151 and rectified by bridge 149 and filtered by resistor 150 and capacitor 152 to develop a positive D.C. voltage sample whose amplitude is proportional to the average output A.C. voltage levels of the generator winding.

Variable resistor 154 and resistor 154, 156 form a voltage divider between the output sample voltage which has been rectified and filtered and the negative reference voltage established by a reference diode 155. Junction 157 is the input voltage to the gain amplifier arrangement 159 which is a high gain operational amplifier well known in the art. Resistors 161 and 162 serve to limit the feedback gain of the amplifier arrangement 159 which is a high gain operational amplifier well known in the art. Resistors 161 and 162 serve to limit the feedback gain of the amplifier. Gain can be adjusted by variable resistor 161.

In operation, the D.C. sample of the average output level of the generator is compared to the negative reference level by divider 154 and 156. If the output level is too high, amplifier input 157 goes positive from ground and the amplifier output is reduced. This reduces the conduction of transistor 145, thereby increasing the resistance of the regulator in the exciter circuit, reducing the "Q" and thereby reducing the excitation drive, hence reducing the generator output. If the generator output were to go too low, the opposite of the above sequence would occur. Thus the regulator operates in a closed loop manner to maintain the generator output level at the desired level. Varying of resistor 154, the voltage setting potentiometer, will allow the regulator's quiescent state to be reached at different output levels of the generator thereby allowing a voltage setting position. Increasing resistor 161 increases the regulator's sensitivity, reducing the voltage error excursion of the generator output.

Plural Magnetizing Heads

Figure 11:
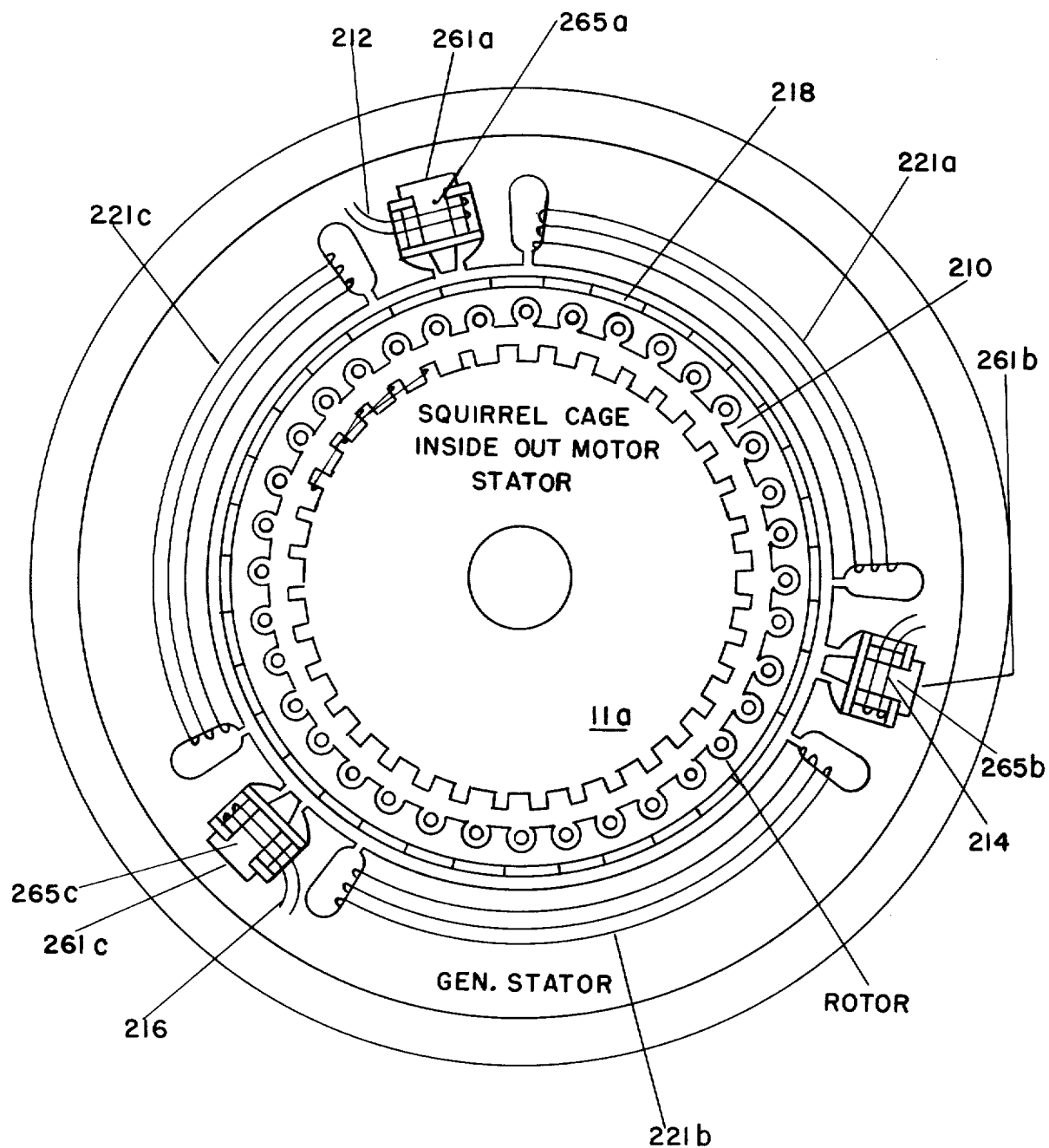
FIG. 11 shows a three-phase constant frequency generator having three excitation heads.

Although in the machine hereinbefore described, only one magnetizing head is used, it is possible to have a plurality of magnetizing heads, and also as shown in FIG. 11, it is possible to have the generator stator on the outside and the motor stator on the inside. The machine there shown has three slots 261*a*, 261*b*, 261*c* for three magnetizing heads 265*a*, 265*b*, 265*c*.

Also, there are three sets of excitation coils 212, 214 and 216, and three sets of output coils 221*a*, 221*b* and 221*c*, all on the outside. As magnetic material 218 on rotor 210 passes before the first phase magnetizing head 265*a*, a magnet is imprinted thereon. This magnet then induces a current in the output coil 221*a*. Magnet 218*a* then passes before excitation head 265*b* which erases as necessary the magnet printed on rotor 210 and prints a new magnet as necessary thereon. This new magnet then induces a current in coil 221*b*. The same thing then happens as the rotor periphery rotates past excitation head 265*c* and output coil 221*c*.

The excitation coils 212, 214 and 216 are independent from one another so that the current induced in output coil 221*a* is dependent on the field strength as corrected, of the magnet induced by excitation coil 212. The same is true for the two other poles. The periphery of the rotor is made of material having a high degree of magnetic memory and the three excitation coils 212, 214, 216 and spaced 120° apart around the rotor. These excitation coils are comparatively quite narrow and span only a few degrees of arc. Next to each excitation coil 212, 214, 216 is the corresponding output coil 221*a*, 221*b*, 221*c*. The output coils span the larger part of the 120° between the excitation coils. One advantage of a 3-excitation head, 3-phase machine in this configuration is that the phase angles between phases of the output voltage do not vary greatly with changes in the rotor speed.

Since the three phases act independently, it is therefore necessary to control the three phases to obtain an output voltage within certain predetermined limits.

Figure 12:
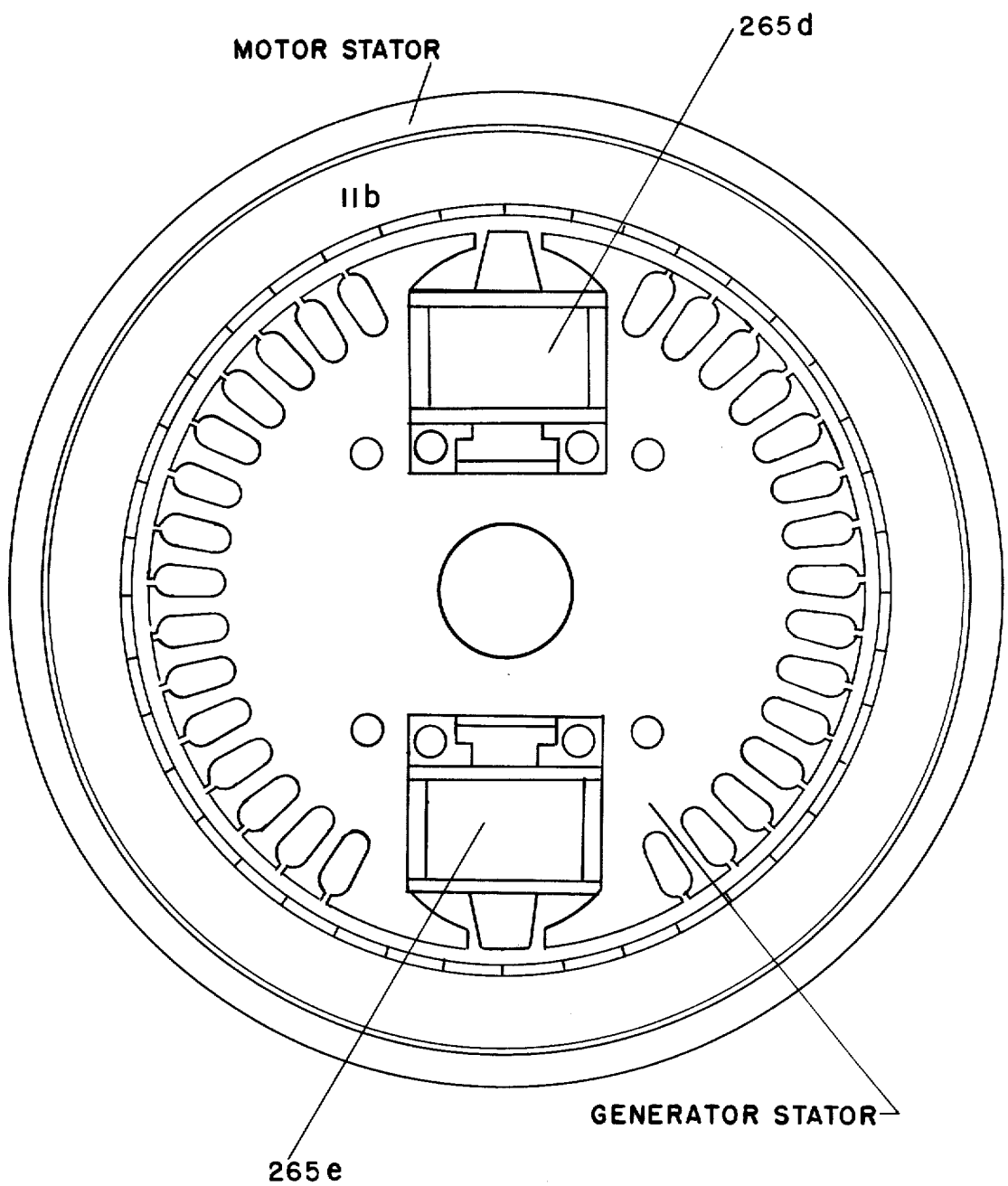
FIG. 12 shows a two-excitation head arrangement of the inside-out type.
Figure 13:
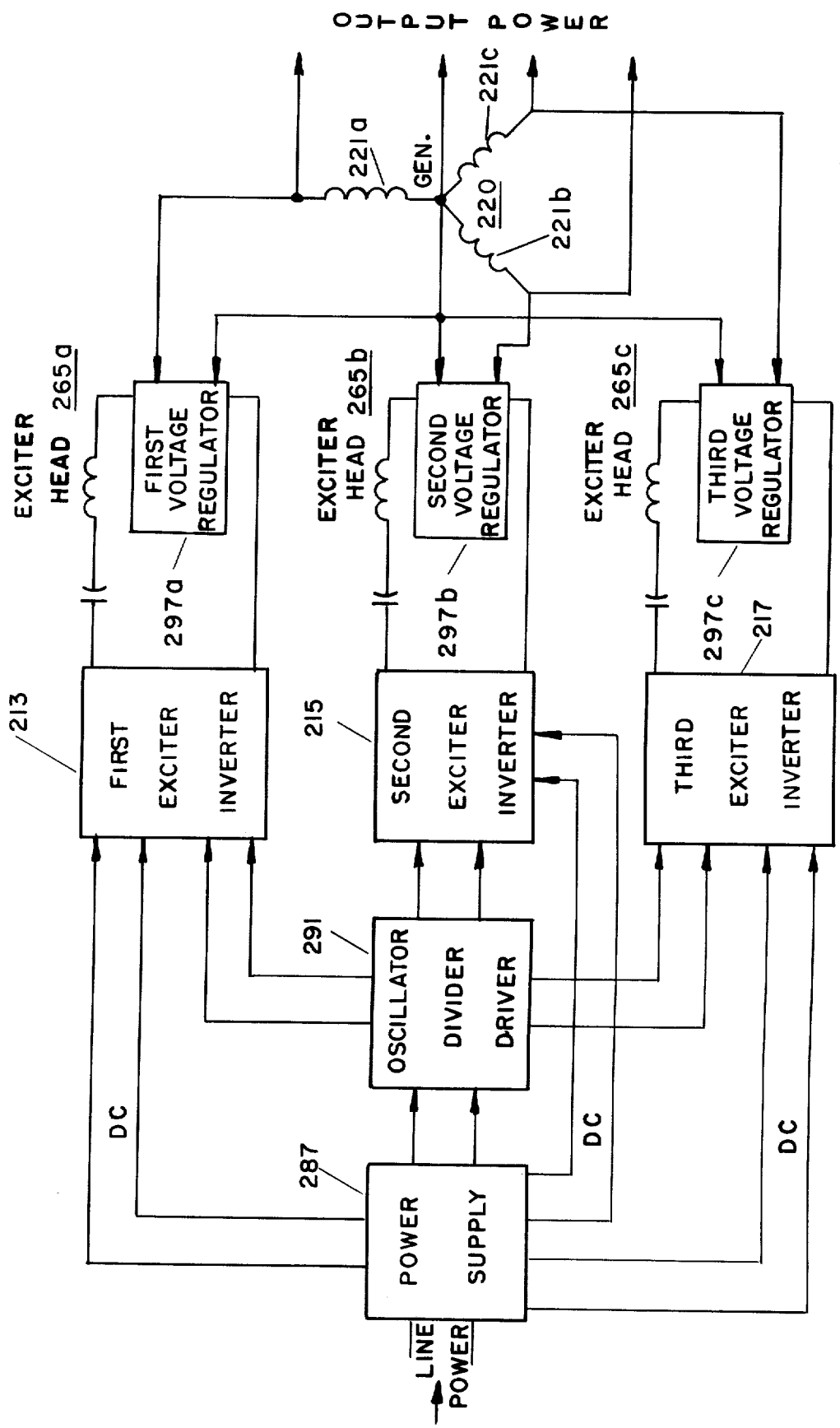
FIG. 13 illustrates a block diagram of a control arrangement for the three-phase arrangement of FIG. 11 illustrating the system.

A block diagram of such a control arrangement is depicted in FIG. 13 showing the first, second and third phase exciter inverters 213, 215, 217 fed by power supply 287 and oscillator divider driver circuit 291. The output coils 221*a*, 221*b*, 221*c* are connected in a WYE arrangement 220. The output in the WYE arrangement is fed to first, second and third voltage regulators 297*a*, 297*b*, 297*c*. If there is a voltage charge on the first phase, this charge is sensed. Likewise, the charge on the second and third phases are sensed, providing control to each exciter head independently. In FIG. 11, the motor portion 11*a* is of the inside-out type (see FIG. 2, S. Saslow et al., U.S. Pat. No. 3,196,940). As shown in FIG. 12 it is possible to have the motor portion 11*b* on the outside and the plural excitation heads 265*d*, 265*e*, two being shown in this embodiment, on the inside of the rotor. These two excitation heads 265*d*, 265*e* are 180° apart, as shown in FIG. 12. This improves the voltage regulation since the voltage reduction effect which would ordinarily occur due to pole overlap with changes in speed is minimized by the use of multiple excitation heads. Usually, when there is a change in speed, there is what can best be described as a tendency towards voltage disagreement, or a voltage disagreement effect. This tendency is reduced at least partially by multiple excitation heads.

Overall Concept

It is to be observed therefore that the present invention provides for a single rotor, motor-generator set with the rotor turning adjacent to and preferably between the two stators. The rotor has a first rotor periphery facing the motor stator and a second rotor periphery facing the generator stator periphery. These are driver elements, e.g., coils, gear teeth, etc., on the motor periphery and corresponding driven elements, squirrel cage bars, coils, driven gear teeth, on the rotor first periphery. Also, there is a layer of permanent magnet material at least on the rotor second periphery.

Furthermore, there is at least one magnetizing station along the generator stator periphery with magnet forming means thereat disposed to form permanent magnets in the rotor permanent magnet material as the rotor periphery turns past the magnetizing station. Frequency excitation means are coupled to the magnet forming means, and there is at least one set of power takeoff elements disposed at least partially around the periphery of the generator stator.

Generally speaking, the positions of the motor and generator stators are as a practical matter not only interchangeable, but it is also possilbe to have a rotor on the inside or outside with coaxial generator and motor stators. The motor stator can be either radially inwards or outwards of the rotor. The generator is then radially outwards or inwards, as the case may be, of the rotor. The generator stator can have first, second and even third phase power output takeoff coils spaced thereon. The motor and generator stators can be in tandem with the rotor inside or outside. This does not mean two units, a motor and a generator, but two stators, with only one rotor.

I claim:

1. A single rotor, motor-generator set, providing a constant output AC generator frequency notwithstanding rotation at a varying speed by the motor, comprising in combination:
   a. a rotor and stator means, said stator means including motor and generator stator elements having motor and generator peripheries defined thereon, said peripheries of said motor and generator stator elements being in close proximity to said rotor which is located for rotation close to the two stator elements and so disposed that magnet lines of force can couple between the rotor and the generator stator element;
   b. a first rotor periphery adjacent the periphery of the motor stator element and a second rotor periphery facing the periphery of the generator stator element with driven means on the motor stator element periphery and driven means on the rotor first periphery;
   c. a layer of permanent magnet material on said rotor second periphery;
   d. at least one magnetizing station along said generator stator element periphery with magnet forming means thereat disposed to form permanent magnets in said permanent magnet material as said rotor periphery turns past said station with frequency excitation means coupled to the magnet forming means said magnet forming means being responsive to the frequency of said frequency excitation means and forming magnets at said frequency;
   e. at least one set of power takeoff elements disposed at least partially around the periphery of said generator stator elements angularly separated from said magnetizing station; and,
   f. a feedback loop between the power takeoff elements and the magnet forming means for maintaining the output voltage at a desired level by controlling the strength of the permanent magnets formed in said permanent magnet material.

2. A motor-generator set as claimed in claim 1 wherein said motor stator element is radially inwards and said generator stator element is radially outwards of said rotor, said two elements and said rotor being coaxially disposed.

3. A motor-generator set as claimed in claim 1 wherein said motor stator element is radially outwards and said generator stator element is radially inwards of said rotor, said two elements and said rotor being coaxially disposed.

4. A motor-generator set as claimed in claim 1 wherein said stator means is one elongated unit with the motor stator element on one side and the generator stator element on the other side, said rotor being coaxial with said unit and radially outwards of said unit.

5. A motor-generator set as claimed in claim 1 wherein said stator means is one elongated unit with the motor stator element on one side and the generator stator element on the other side, said rotor being coaxial with said unit and radially inwards of said unit.

6. A motor-generator set as claimed in claim 1 wherein said motor stator element, said generator stator element and said rotor are all coaxial.

7. A motor-generator set as claimed in claim 1 wherein said generator stator element has at least first and second phase power output take-off coils sequentially spaced thereon.

8. A motor-generator set as claimed in claim 7 wherein said generator stator element has at least two magnetizing stations along said generator stator periphery with magnet forming means thereat disposed to form permanent magnets in said rotor permanent magnet material.

9. A motor-generator set as claimed in claim 1 including second and third magnetizing heads about 120° apart.

10. A motor-generator set as claimed in claim 1 including a second magnetizing head 180° from said first head, more or less.

11. A motor-generator set as claimed in claim 6 wherein said generator stator has at least first and second phase power output takeoff coils sequentially spaced thereon.

12. A motor-generator set as claimed in claim 11 wherein said generator stator has at least two magnetizing heads along said generator stator periphery with magnet forming means thereat disposed to form permanent magnets in said rotor permanent magnet material.

13. In a motor-generator set having a drum-shaped rotor with a drive shaft and an extended core of high permeability magnetic material supported by said shaft with a rotor periphery of defined width on the rotor having a layer of permanent magnet material on said rotor periphery, in combination therewith:
   a. a generator-stator element with a stator periphery adjacent to said rotor periphery and coaxial therewith, said stator element having first, second and third phase power output takeoff coils sequentially spaced thereon;
   b. at least one magnetizing unit housing in said stator element having an elongated magnetizing slot in said stator periphery angulary disposed with regard to said drive shaft across said rotor periphery width;
   c. at least one magnetizing unit in said housing with frequency excitation means and a magnetizing head in said magnetizing housing, said frequency excitation means supplying a desired frequency to said magnetizing head so that as said rotor member rotates, permanent magnets with poles are endlessly imprinted in the permanent magnet material as said rotor periphery passes before the magnetizing head, which permanent magnets then sequentially induce power in said first, second and third phase power output takeoff coils, said permanent magnets being erased from said permanent magnet material as said magnets again pass before a magnetizing head at which time new permanent magnets are imprinted in said permanent magnet material; and, d. electrical quantity sensing means sensing electric quantity in the power output takeoff coils, with a feedback loop between said power output takeoff coils and said electric excitation means controlling the magnetic strength of the imprinted permanent magnets in accordance with the sensed electrical quantity.

14. A motor-generator set as claimed in claim 13 including second and third magnetizing units 120° apart.

15. A motor-generator set as claimed in claim 13 including a second magnetizing unit 180° from said first unit.

16. A motor-generator set as claimed in claim 1 wherein said driver means and driven means are electric-magnetic driver and driven elements, said motor stator element being so disposed with respect to said rotor that electric lines of force from said motor element can likewise couple onto said rotor.

17. In a motor-generator set, the generator being of the type wherein a rotor with a high retentivity permanent magnet material on at least the periphery thereof is disposed for rotation adjacent to a magnetizing head located on stator means which magnetizing head includes frequency excitation means coupled thereto causing said magnetizing head to print magnets on the rotor periphery at a predetermined frequency, and wherein a power takeoff means is disposed along the circular travel path of the rotor angularly displaced from the magnetizing head so that as said rotor passes said magnetizing head, permanent magnets at said predetermined frequency are endlessly imprinted on said rotor periphery on the first rotation cycle and, which permanent magnets are substantially erased as the imprinted magnets again pass before said magnetizing head on the next rotation cycle at which time new permanent magnets are imprinted on said rotor periphery so as to cause to travel past said power takeoff means a quantity of permanent magnets corresponding to said predetermined frequency thereby inducing into said power takeoff means an alternating frequency corresponding to the predetermined frequency of said frequency excitation means, in combination a. a first section on said rotor with driven means on said first section disposed for being driven by corresponding means when coupled thereto;

b. motor means disposed in close proximity to said rotor said motor means having driver means disposed for coupling with said driven means so as to turn said rotor;

c. a second section on said rotor including said high retentivity material so disposed that said high retentivity material faces said generator stator element so that magnetic lines of force emanating from said magnetizing head will couple into and form permanent magnets in said rotor high retentivity material and the permanent magnets so formed will couple into said power takeoff means inducing an alternating electric current thereon as said rotor turns.

18. A motor-generator set as claimed in claim 17 wherein said motor means is radially inwards and said generator stator means is radially outwards of said rotor, said motor means, generator stator means and said rotor being coaxially disposed.

19. A motor-generator set as claimed in claim 17 wherein said motor means is radially outwards and said generator stator means is radially inwards of said rotor, said motor means, generator stator means and said rotor being coaxially disposed.

20. A motor-generator set as claimed in claim 17 wherein said motor means and said generator stator means is one elongated unit with the motor means on one side and the generator stator means on the other side, said rotor being coaxial with said stator means and radially outwards of said unit.

21. A motor-generator set as claimed in claim 17 wherein said motor means and generator stator means is one elongated unit with the motor means on one side and the generator stator means on the other side, said rotor being coaxial with said unit and radially inwards of said unit.

22. A motor-generator set as claimed in claim 17 wherein said motor, said generator stator means and said rotor are all coaxial.

23. A motor-generator set as claimed in claim 17 wherein said generator stator means has at least first and second phase power output takeoff coils sequentially spaced thereon.

24. A motor-generator set as claimed in claim 23, wherein said generator stator means has at least two magnetizing heads along said generator stator means periphery with magnet forming means thereat disposed to form permanent magnets in said rotor permanent material.

25. A motor-generator set as claimed in claim 17 including second and third magnetizing head 120° apart.

26. A motor-generator set as claimed in claim 1 including a second magnetizing head about 180° from said first head.

27. A motor-generator set as claimed in claim 22 wherein said generator stator means has at least first and second phase power output takeoff coils sequentially spaced thereon.

28. A motor-generator set as claimed in claim 27 wherein said generator stator means has at least two magnetizing heads along said generator stator means periphery with magnet forming means thereat disposed to form permanent magnets in said rotor permanent magnet material.

29. A motor-generator set as claimed in claim 17 wherein said driver means and driven means are electro-magnetic driver and driven means, said motor means being so disposed with respect to said rotor that electric lines of force from said motor means will couple onto said rotor.

\* \* \* \* \*